United States Patent [19]
Tso

[11] Patent Number: 5,890,016
[45] Date of Patent: *Mar. 30, 1999

[54] HYBRID COMPUTER ADD IN DEVICE FOR SELECTIVELY COUPLING TO PERSONAL COMPUTER OR SOLELY TO ANOTHER ADD IN DEVICE FOR PROPER FUNCTIONING

[75] Inventor: Michael Man-Hak Tso, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 643,948

[22] Filed: May 7, 1996

[51] Int. Cl.$^6$ ...................................................... G06F 13/00
[52] U.S. Cl. ........................................... 395/884; 395/822
[58] Field of Search ...................... 235/380, 486; 395/281, 887, 893, 884, 822; 455/343

[56] References Cited

U.S. PATENT DOCUMENTS

| | | | |
|---|---|---|---|
| 4,689,478 | 8/1987 | Hale et al. ................................ | 235/380 |
| 5,500,517 | 3/1996 | Cagliostro ................................ | 235/486 |
| 5,611,055 | 3/1997 | Krishan et al. .......................... | 395/281 |
| 5,615,393 | 3/1997 | Kikinis et al. ........................... | 395/887 |
| 5,664,231 | 9/1997 | Postman et al. ......................... | 395/893 |
| 5,678,229 | 10/1997 | Seki et al. ............................... | 455/343 |
| 5,708,840 | 1/1998 | Kikinis et al. ........................... | 395/800 |

*Primary Examiner*—Thomas C. Lee
*Assistant Examiner*—David Ton
*Attorney, Agent, or Firm*—Blakely, Sokoloff, Taylor & Zafman LLP

[57] ABSTRACT

A personal computer add in device unit having functionality in a stand alone environment away from a personal computer. In one embodiment, a hybrid add in device has a PCMCIA (Personal Computer Memory Card International Association) client interface for interfacing with a PCMCIA host interface of a personal computer and a PCMCIA host interface and for interfacing with a PCMCIA client interface of another add in device.

26 Claims, 5 Drawing Sheets

HYBRID COMPUTER ADD IN DEVICE FOR SELECTIVELY COUPLING TO PERSONAL COMPUTER OR SOLELY TO ANOTHER ADD IN DEVICE FOR PROPER FUNCTIONING

BACKGROUND OF THE INVENTION

1. Field of the Invention

The present invention is related to the field of personal computer add in devices. More specifically, the present invention is related to the method and apparatus for providing functionality to two personal computer add in devices when they are uncoupled from a personal computer.

2. Prior Art

Currently, there are many different types of personal computer add in devices available. Some examples of such add in devices include modems, LAN (local area network) adapters, and PDA's (personal digital assistants). Add-in devices can be in different form factors or socket configurations, e.g. personal computer card (PC Card) form factor or Universal Serial Bus (USB) socket configuration.

A PC Card is an add in device which typically contains different software logic and is docked to a computer to provide additional applications and or capabilities to the computer. A cellular modem in a PC Card form factor is an add in device which is used for converting digital data from a computer to a signal that can be transmitted to a remote device and for converting the signal received from a remote device into digital data for the computer.

Traditional personal computer add in devices lose functionality in a stand alone environment away from a personal computer. For example, the cellular modem card loses its functionality when undocked from a computer.

It is therefore desirable to have a method and an apparatus which gives functionality to computer add in devices when uncoupled from a computer.

BRIEF SUMMARY OF THE INVENTION

A method and an apparatus for coupling two personal computer add in devices and giving the coupled add in devices functionality in a stand alone environment away from a personal computer are disclosed. In one embodiment of the present invention, a hybrid add in device of the present invention has a PCMCIA (Personal Computer Memory Card International Association) client interface for interfacing with a PCMCIA host interface of a personal computer. The hybrid add in device also has a PCMCIA host interface for interfacing with a PCMCIA client interface of another add in device. In another embodiment, the hybrid add in device has a universal serial bus (USB) configuration.

DETAILED DESCRIPTION OF THE INVENTION

The present invention is a method and an apparatus for coupling and providing functionality to personal computer add in devices when the add in devices are uncoupled from a personal computer. More specifically, the present invention adds a host interface to one of the add in devices. The add in device with the host interface is referred herein as a hybrid add in device.

Although the present invention may be implemented with any computer add in device which adds functionality to a computer system, the following describes the present invention in terms of two specific exemplary add-in devices, namely a personal digital assistant (PDA) and a cellular modem card. Other embodiments using different add in devices may be implemented by a person skilled in the art using the present invention.

The present invention also applies to any form factor. The discussions herein will refer to the PC Card interface and form factor as defined by PCMCIA (Personal Computer Memory Card International Association) version 1.0. PCMCIA and PC Card will be used synonymously.

Figure 1A:
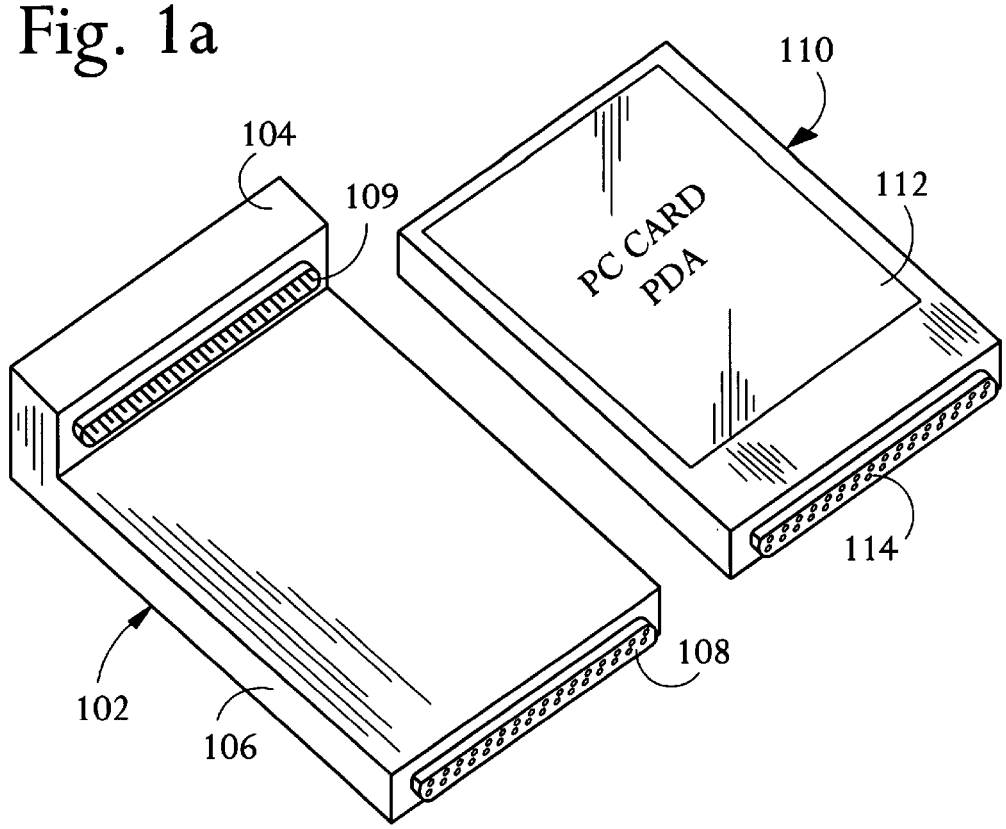
FIG. 1a illustrates one embodiment of the present invention's physical component parts.

FIG. 1a illustrates an exemplary embodiment of the present invention's physical component parts. A hybrid add in device, such as a wireless cellular modem 102 (also referred herein as cellular modem or cellular modem card), has a wireless transceiver 104 that transmits and receives signals from a remote location, a DSP (Digital Signal Processor) logic 106 which may typically be found in cellular devices and is for processing radio and communication protocols including modem functions, and PC card interfaces 108 and 109 for interfacing wireless cellular modem 102 with a computer. Another add in device, PDA 110, has an LCD (Liquid Crystal Display) touch sensitive screen 112 for receiving user input and PC card interface 114 for coupling PDA 110 with a computer or with cellular modem 102. In an alternate embodiment, PDA 110 may have a keyboard for accepting user inputs or any other user interface capable of accepting inputs from a user and displaying outputs to a user.

A cellular modem is typically used for converting digital data from a computer to an analog signal that can be transmitted to a remote device, and for converting a received analog signal from a remote device into digital data for the computer. A PDA (personal digital assistant) typically has a screen for displaying data to a user and some type of input medium such as a keyboard or a touch sensitive screen. A PDA is used to save appointment and calendar information as well as telephone numbers, etc.

With the present invention, a PDA with a PC Card form factor becomes an "attachable" UI (user interface) for a cellular modem also with a PC Card form factor when the cellular modem is undocked from a personal computer. For example, the PDA provides the input output capability necessary for configuring the cellular modem. More specifically, a user may use the keyboard or the touch sensitive screen provided on the present invention's PDA portion to input data to be transmitted through the cellular modem. Additionally, the user may view data received through the cellular modem using the PDA screen.

The PDA described herein is manufactured in the PC Card form factor and can be docked with a PC (not shown) via a PC Card interface for data synchronization. This is different from classic PDA's which are larger, heavier, and cannot be docked with PC's via PCMCIA (typically via serial or parallel port). This PDA is manufactured by Intel Corporation. It has the same functionality and design as regular PDA's, except it is packaged more aggressively into a PC Card form factor. This PDA is simply used in this invention as an example of an add-in device which has built in input and output capabilities.

With the present invention, the cellular modem becomes an "attachable" communication module for the PDA when the PDA is undocked from a PC. More specifically, the cellular modem provides the PDA with "always on" connectivity, such that the PDA may, for example, send and receive PIM (personal information manager) updates and receive news anytime, anywhere. At least one of the add-in devices (i.e. the cellular modem or the PDA) is equipped with some type of battery (not shown) which functions as a source of power for the combined unit.

A PIM is typically used for software application suite of integrated or single application to manage calendar, phone book or to do list and various other personal databases and to view other's personal databases to make updates, etc. PIMs currently available in the market include ECCO from NetManage and OnTime from Campbell.

Figure 1B:
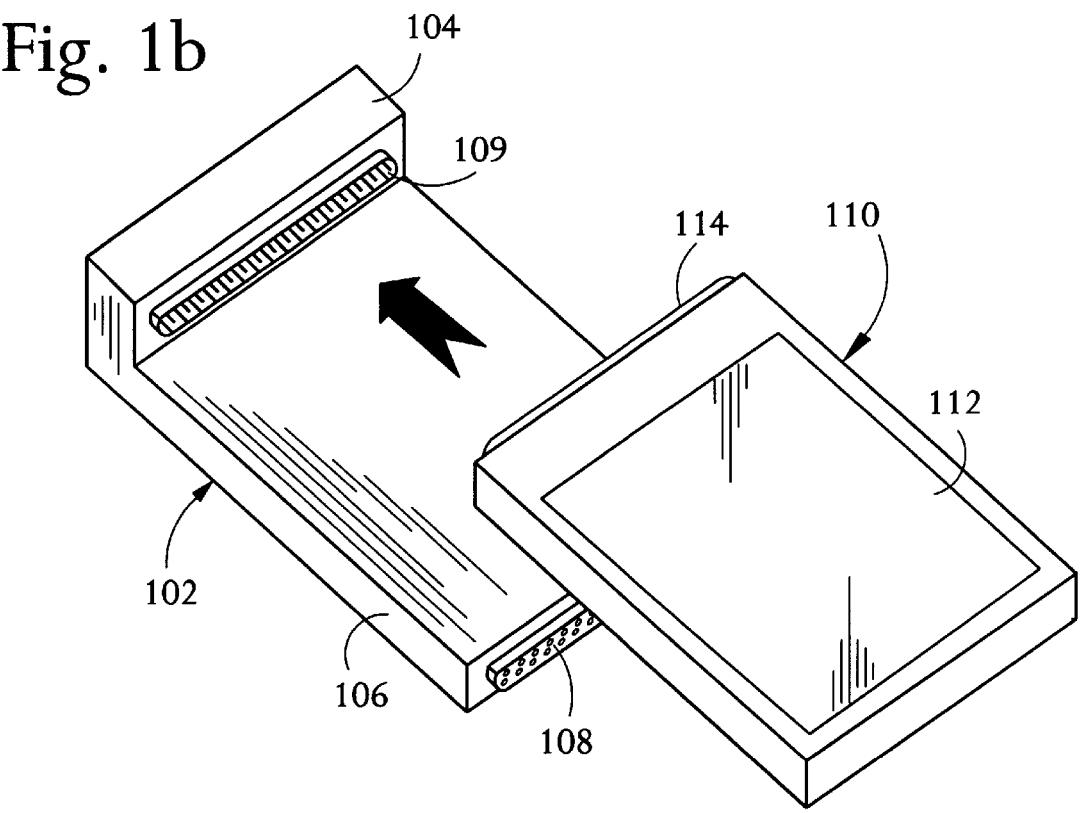
FIG. 1b illustrates the coupling of a wireless cellular modem card with a PC card.

FIG. 1b illustrates the coupling of wireless cellular modem 102 with PDA 110, both separately illustrated in FIG. 1a. Once wireless cellular modem 102 and PDA 110 are coupled to each other, PDA 110 is able to send and receive data, and cellular wireless modem 102 is able to receive input and produce output information such that a user may set features on the modem or send data to another user. Thus, with the present invention, neither PDA 110 nor cellular modem 102 have to depend on a PC for them to be useful in their stand alone environment apart from the PC.

In one embodiment, the present invention may be implemented such that a PC Card connector is added to wireless cellular modem 102 at an appropriate location such as PC Card connector 109. The PC Card hardware on cellular modem 102 is a "host side hardware," i.e. similar to those required for a notebook PC's PC Card socket. The communication protocol between PDA 110 and wireless cellular modem 102 is implemented with the necessary handshake and device identification as specified by the PCMCIA standard. A further description of the exemplary embodiment is illustrated in FIGS. 2 and 3 and the accompanying description.

Figure 2:
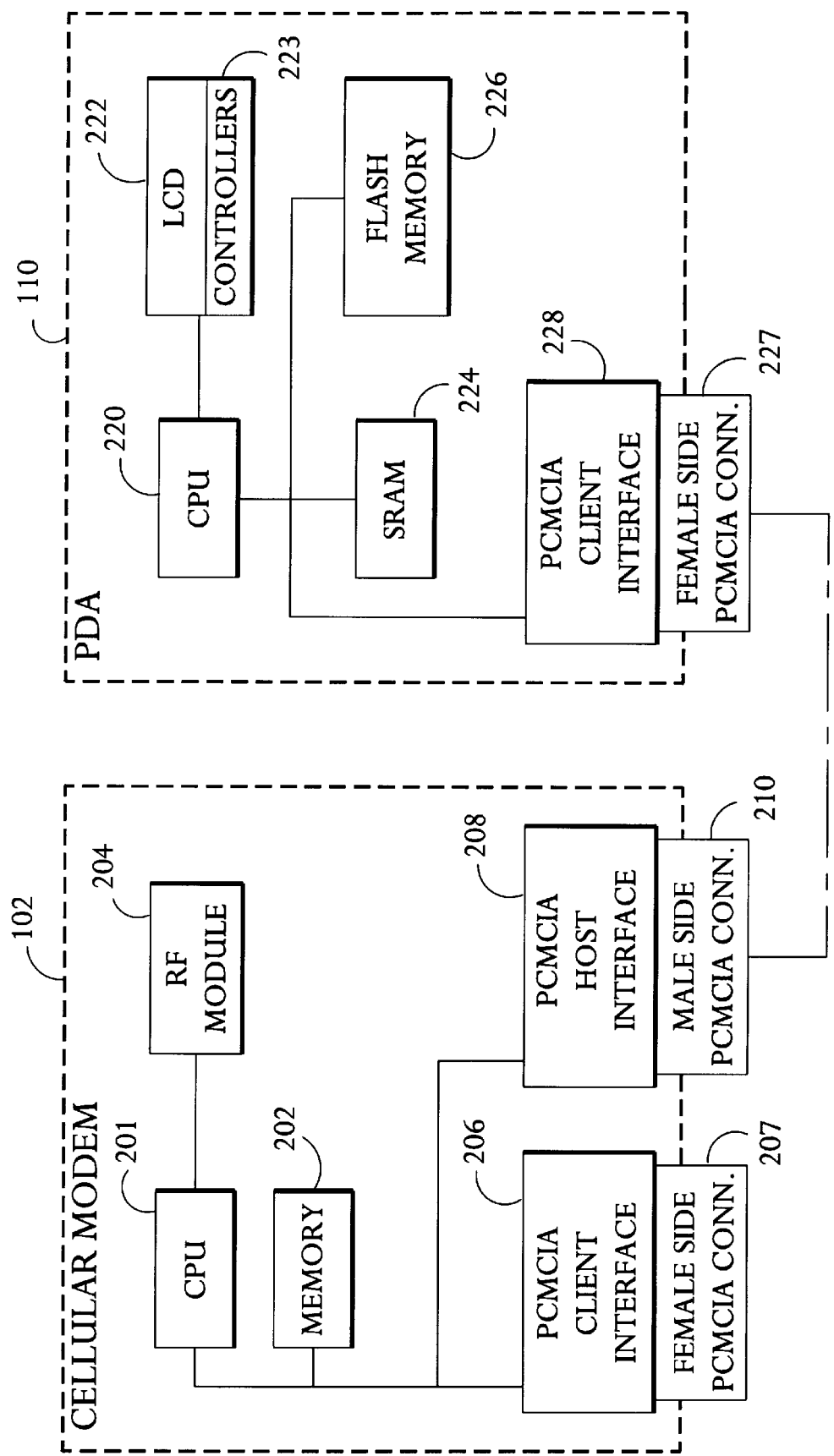
FIG. 2 illustrates an exemplary schematic of the present invention.
Figure 3:
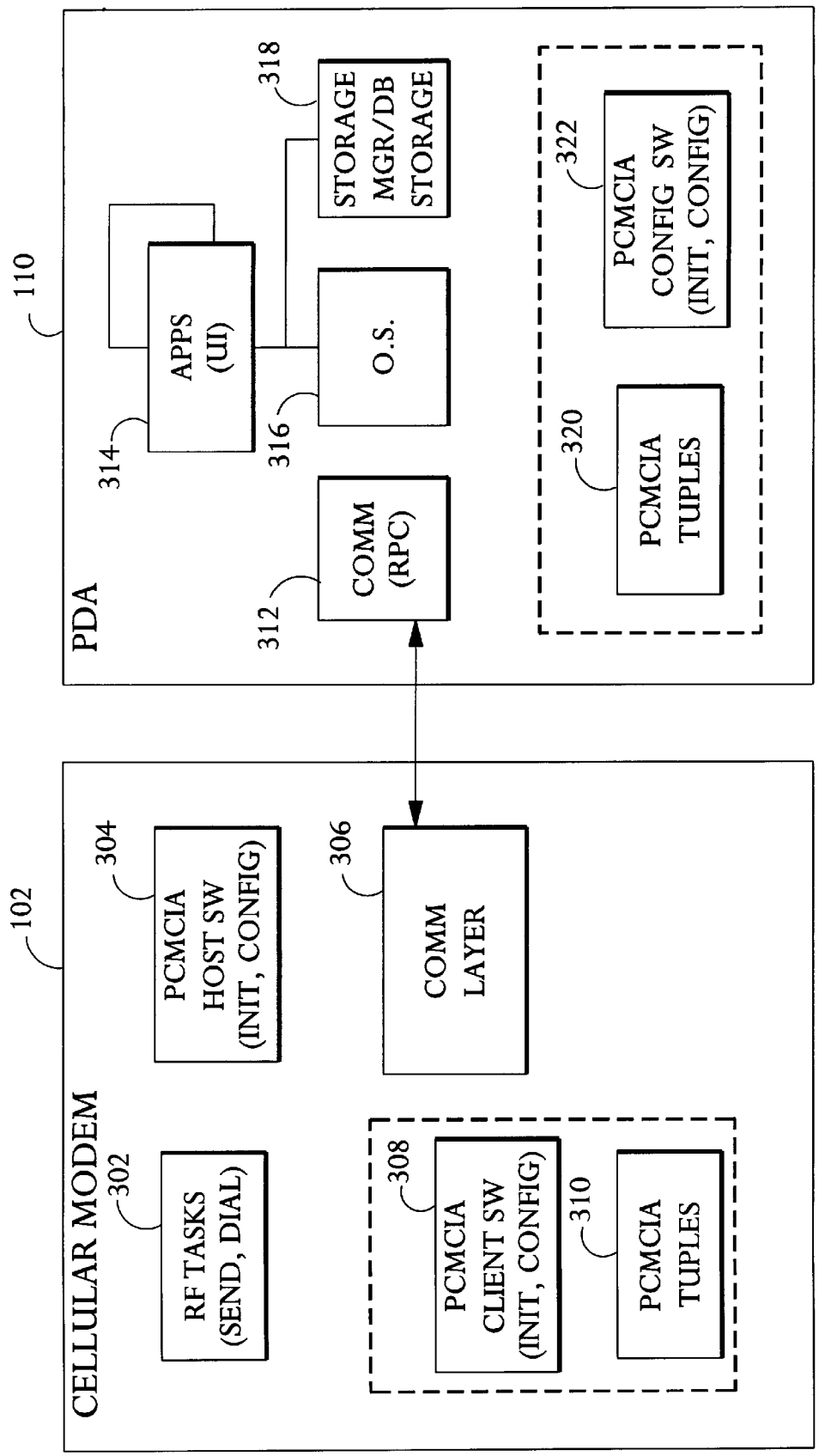
FIG. 3 illustrates an exemplary software embodiment of the present invention.

FIG. 2 illustrates an exemplary hardware implementation of the present invention. Cellular modem 102 has a CPU (central processing unit) 201 coupled to memory 202 and RF (radio frequency) module 204 for enabling wireless communication. An off the shell chip-set offered, for example, by Lucent Technologies, Inc. (of New Jersey) with base band and radio frequency processing may be used.

Cellular modem 102 also has PCMCIA client interface 206 with female side PCMCIA connector 207 for communicating with a PCMCIA host such as may be found in a PC. With the implementation of the present invention, PCMCIA host interface 208 of cellular modem 102 communicates with PCMCIA client interface 228 of PDA 110 and has a special connector 210 which is a male side PCMCIA connector.

PDA 110 has a CPU 220 coupled to LCD (Liquid Crystal Display) 222 for displaying images and text, controllers 223 for coordinating and controlling the operations of one or more input/output devices, such as workstations, and for synchronizing operations of such devices with the operations of PDA 110 as a whole. PDA 110 also has SRAM 224, flash memory 226 and PCMCIA client interface 228. PCMCIA client interface 228 has female side PCMCIA connector 227 for coupling with special connector 210.

FIG. 3 illustrates an exemplary software embodiment of the present invention. Cellular modem 102 has RF (radio frequency) tasks 302 for sending and receiving messages; PCMCIA host software 304 for handling the start-up operation, for configuring PDA 110 and for determining PC card information such as how much power the card has, what type of card it is, how much memory the card uses, etc. Cellular modem 102 also has communication layer 306 for processing the data received and transmitted through cellular modem 102. Additionally, cellular modem 102 has PCMCIA client software 308 with standard PCMCIA configuration software and PCMCIA tuples 310. PCMCIA tuples are data found only on a PCMCIA client device which identifies the device as a PCMCIA client device and is well understood in the art.

On PDA 110 side, communication layer 312 sends and receives data through communication layer 306 of cellular modem 102. Additionally, PDA 110 has user interface applications 314 with graphical user interface applications allowing for data input by the user and data output to the user, a real time operating system 316, a storage manager 318 with a database storage containing a PIM, a calendar and other personal database information, a PCMCIA tuples 320 and PCMCIA client software 322 which is able to interface with PCMCIA host software 304 of cellular modem 102 through communication layer 312 and communication layer 306. The PCMCIA tuples 320 and PCMCIA client software 322 of PDA 110 perform the same tasks as PCMCIA client software 308 and PCMCIA tuples 310 of cellular modem 102.

When PDA 110 and cellular modem 102 are coupled, PCMCIA client software 322 of PDA 110 and PCMCIA host software 302 of cellular modem 102 are interfaced. Further, PCMCIA client software 308 of cellular modem shuts down. Conversely, when cellular modem 102 is docked to a PC and uncoupled from PDA 110, PCMCIA client software 322 of PDA 110 shuts down. With the above illustrated embodiment of the present invention, PDA 110 does not need to be altered from the currently existing models.

Figure 4A:
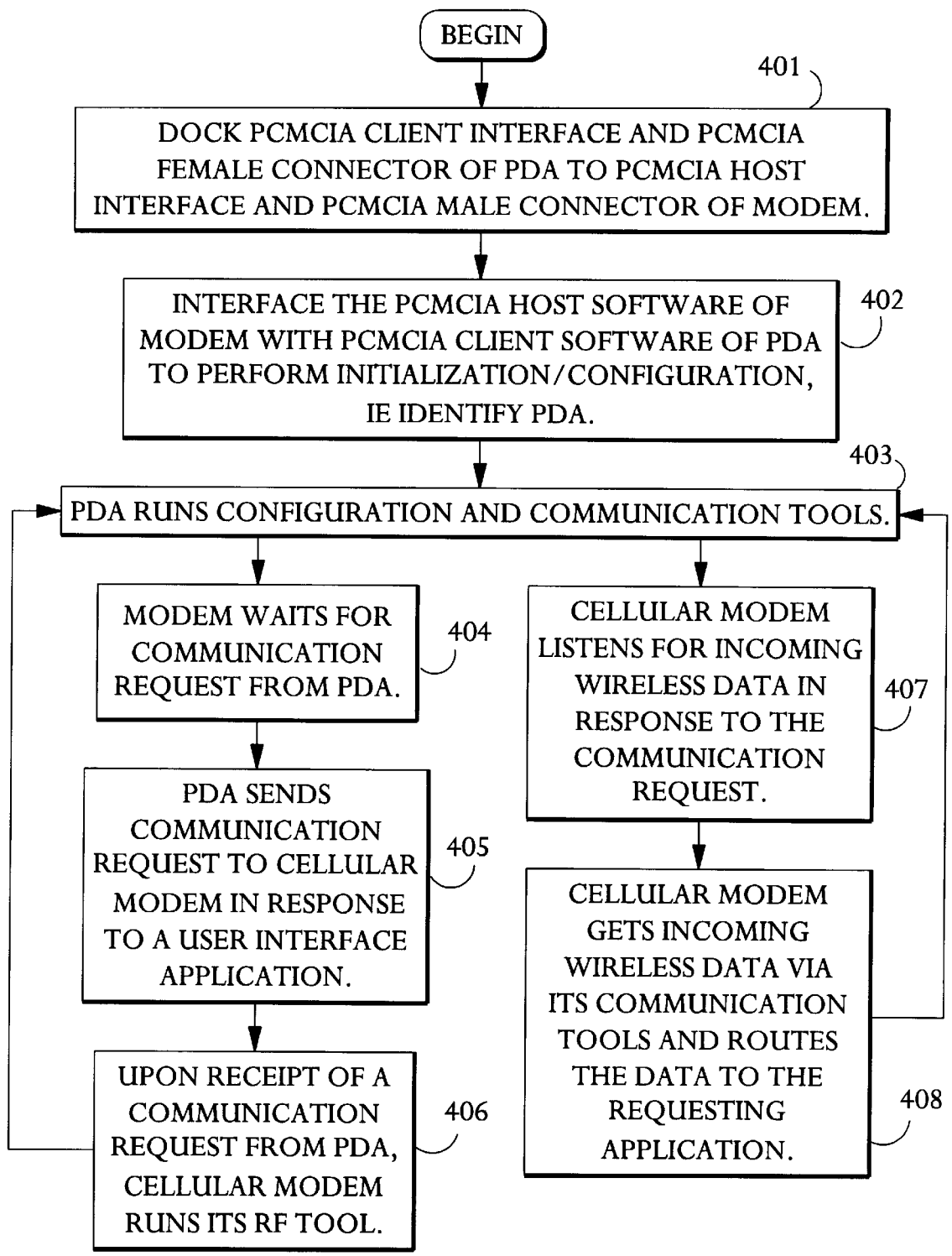
FIGS. 4a and 4b are flow diagrams illustrating the general steps followed by the present invention.

FIG. 4a is a flow diagram illustrating the general steps followed by the present invention upon coupling of the cellular modem and the PDA of the present invention. In step 401, PDA 110 is docked to cellular modem 102 by interfacing PCMCIA host interface 208 and PCMCIA male connector 210 of cellular modem 102 with PCMCIA client interface 228 and PCMCIA female connector 227 of PDA 110. In step 402, upon coupling of cellular modem 102 with PDA 110, PCMCIA host software 304 of cellular modem 102 interfaces with PCMCIA client software 322 of PDA 110 and identifies PDA 110. The identification process includes, for example, determining whether or not the correct type of PC Card has been docked to cellular modem 102.

In step 403, after completing standard card level handshaking, such as identifying the card, PCMCIA host software 304 of cellular modem 102 determines the screen size, memory size and application version, etc. of PC Card 110. PDA 110 may also run a configuration or communication tool which allows PDA 110 to change options on cellular modem 102 or which allows sending or receiving of messages to and from a remote device such as a computer through cellular modem 102. While cellular modem 102 and PC Card 110 are coupled, information may be transmitted between the two. On the modem side, cellular modem 102 may listen for incoming wireless information as well as for communication requests from PDA 110.

In step 404, cellular modem 102 waits for communication request from PDA 110. In step 405, if PDA 110 requests cellular modem 102 to send information in response to application 314, cellular modem 102 transmits the communication request to a predetermined computer. In step 406, once an incoming message is received from the computer, cellular modem 102 informs PDA 110 that the message is received.

At the same time as when cellular modem 102 waits for communication request from PDA 110, cellular modem 102 also waits for incoming wireless information from the computer in response in step 407. In step 408, PDA 110 routes the message from cellular modem 102 to application 314.

Figure 4B:
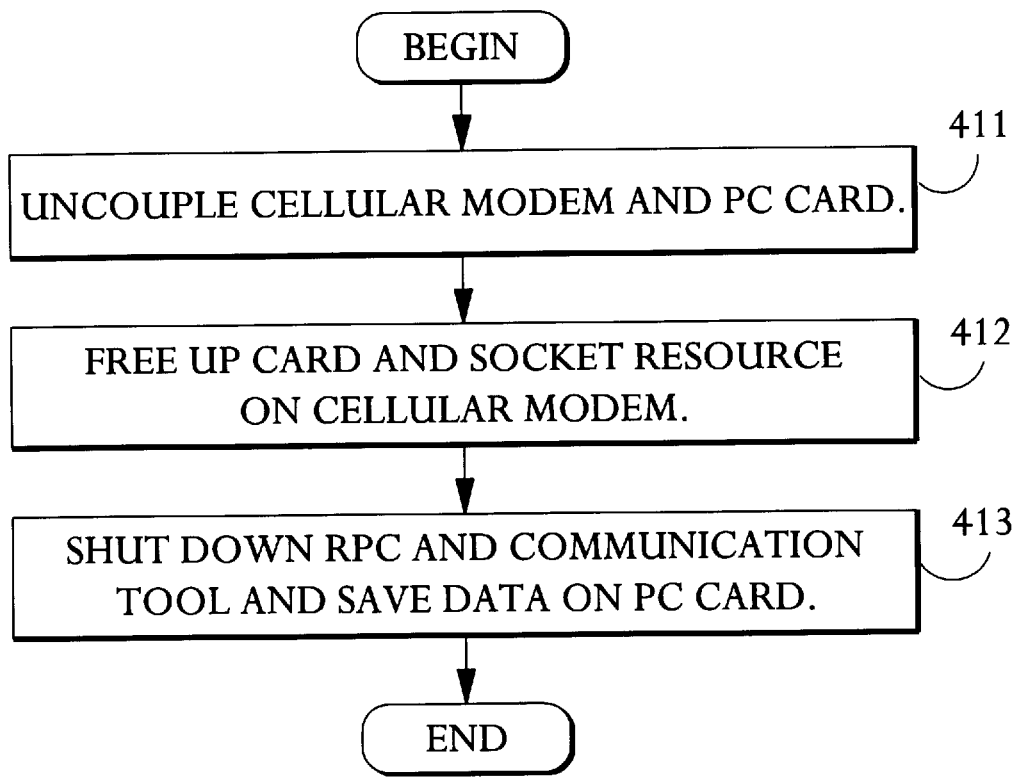

FIG. 4b illustrates the general steps followed by the present invention when the cellular modem and the PDA of the invention are uncoupled. In step 411, once cellular modem 102 and PDA 110 are uncoupled, card and socket resources (memory) are freed up in cellular modem 102 in step 412. In step 413, on the PDA side, communication tools are shut down and transitional data (i.e. data which were being received by the PDA through the cellular modem but not yet processed by the PDA when the PDA and the cellular modem were uncoupled ) for an application on the PDA side are saved. Communication tools referred herein are applications for RF messaging and are well known in the art.

What has been described is a method and an apparatus for providing functionality and coupling to two personal computer add in devices. With one embodiment of the present invention, a PDA and a cellular modem both with a PC Card form factor are coupled. Both the PDA as well as the cellular modem may still be separately coupled to and used with a PC. The main advantage of the present invention is the functionality of the two personal computer add in devices, for example the cellular modem and the PDA, in a stand alone environment apart from a PC. Such capability is especially advantageous in, for example, the mobile usage of the cellular modem and the PDA.

Although the present invention has been described in terms of coupling two specific types of personal computer add in devices, more specifically coupling a personal digital assistant (PDA) with a personal computer (PC) card form factor and a cellular modem also with a PC Card form factor, the present invention is not limited to the specific embodiment described but may be applied to different types of personal computer add in devices. For example, the present invention can be applied to any add-in device with standard connectors and configuration protocols, such as Universal Serial Bus (USB) (Universal Serial Bus Specification Revision 1.0, Jan. 15, 1996, Published Jointly by Compaq, Digital Equipment, IBM PC Co. Intel, Microsoft, NEC and Northern Telecom).

Hence, while certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

Additionally, although the present invention describes the cellular modem as the hybrid device, the invention is not restrictive on which of the two coupled add-in devices to implement as a hybrid device. For example, the PDA may also be implemented as the hybrid device by moving the circuitry and software added to the cellular modem to the PDA.

What is claimed:

1. A first hybrid computer add in device comprising:
   a client interface for coupling to a host interface of a personal computer; and
   a host interface for coupling to a client interface of a second add in device, said first hybrid computer add in device being portable and capable of having functionality when coupled to said personal computer and capable of having functionality when coupled only to said second add in device in a stand alone environment away from said personal computer.

2. The first hybrid computer add in device of claim 1 wherein said client interface further comprises a female connector for coupling to a male connector.

3. The first hybrid computer add in device of claim 1 wherein said host interface further comprises a male connector for coupling to a female connector of a second add in device.

4. The first hybrid computer add in device of claim 1 further comprises a cellular wireless modem.

5. The first hybrid computer add in device of claim 4 comprising host software for performing start-up operations when said first hybrid computer add in device is coupled to a second add in device.

6. The first hybrid computer add in device of claim 1 wherein said client interface further comprises a client software for performing standard configuration tasks.

7. The first hybrid computer add in device of claim 1 wherein said software module comprises a tuples with client information.

8. The first hybrid computer add in device of claim 1 having a PCMCIA configuration.

9. The first hybrid computer add in device of claim 1 having a universal serial bus configuration.

10. A first hybrid computer add in device comprising:
    first means for interfacing to a host interface of a personal computer; and
    second means for interfacing to a client interface of a second add in device, said first hybrid computer add in device being portable and capable of having functionality when coupled to said personal computer and capable of having functionality when coupled only to said second add in device in a stand alone environment away from said personal computer.

11. The first hybrid computer add in device of claim 10 wherein said first means for interfacing further comprises a first means for coupling to a male connector of a personal computer.

12. The first hybrid computer add in device of claim 10 wherein said second means for interfacing further comprises second means for coupling to a female connector of a second add in device.

13. The first hybrid computer add in device of claim 10 further comprises:
    software; and
    means for processing said software module.

14. The first hybrid computer add in device of claim 13 wherein said software module comprises a means for performing start-up operations when said first hybrid computer add in device and a second add in device are coupled.

15. The first hybrid computer add in device of claim 13 wherein said software module comprises a means for performing standard configuration tasks.

16. The first hybrid computer add in device of claim 13 wherein said software module comprises a tuples with client information.

17. The first hybrid computer add in device of claim 10 having a PCMCIA configuration.

18. The first hybrid computer add in device of claim 10 having a universal serial bus configuration.

19. A method for providing functionality to two add in devices comprising the steps of:

docking a client interface and female connector of an add in device to a host interface and a male connector of a hybrid computer add in device; and interfacing a host software of said hybrid computer add in device with a client software of an add in device, said hybrid computer add in device being portable and capable of having functionality when coupled to a personal computer and capable of having functionality when coupled only to said add in device in a stand alone environment away from said personal computer.

20. The method of claim 19 further comprising the step of performing initial start-up operations and configuration using said host software.

21. The method of claim 19 further comprising the step of sending communication request to said hybrid computer add in device in response to a user interface application request for data, said sending performed by said add in device, said user interface application residing in said add in device.

22. The method of claim 19 further comprising the step of receiving said data from a remote source, said receiving performed by said hybrid computer add in device.

23. The method of claim 19 further comprising the step of receiving said data from said hybrid computer add in device, said receiving performed by said add in device.

24. The method of claim 19 further comprising the step of routing said data to said user interface application requesting said data.

25. The method of claim 19 wherein said hybrid computer add in device has a PCMCIA configuration.

26. The method of claim 19 wherein said hybrid computer add in device has a universal serial bus configuration.

* * * * *